C. MESSICK.
ELECTROLIER FITTING.
APPLICATION FILED OCT. 24, 1913.

1,089,490.

Patented Mar. 10, 1914.

Witnesses:

Inventor
Charles Messick

UNITED STATES PATENT OFFICE.

CHARLES MESSICK, OF HACKENSACK, NEW JERSEY.

ELECTROLIER-FITTING.

1,089,490.  Specification of Letters Patent.  Patented Mar. 10, 1914.

Application filed October 24, 1913. Serial No. 797,007.

*To all whom it may concern:*

Be it known that I, CHARLES MESSICK, a citizen of the United States, residing in Hackensack, county of Bergen, State of New Jersey, have invented certain new and useful Improvements in Electrolier-Fittings, of which the following is a specification.

The object of my invention is to provide a cheap and simple fitting, and parts immediately associated therewith, by means of which a pull switch may be mounted in the center of an old or new multiple arm electrolier, with ease and convenience, even after the electrolier is in place.

Reference is made to the accompanying drawing, forming a part of this specification, and in which like letters indicate like parts.

Figure 1:
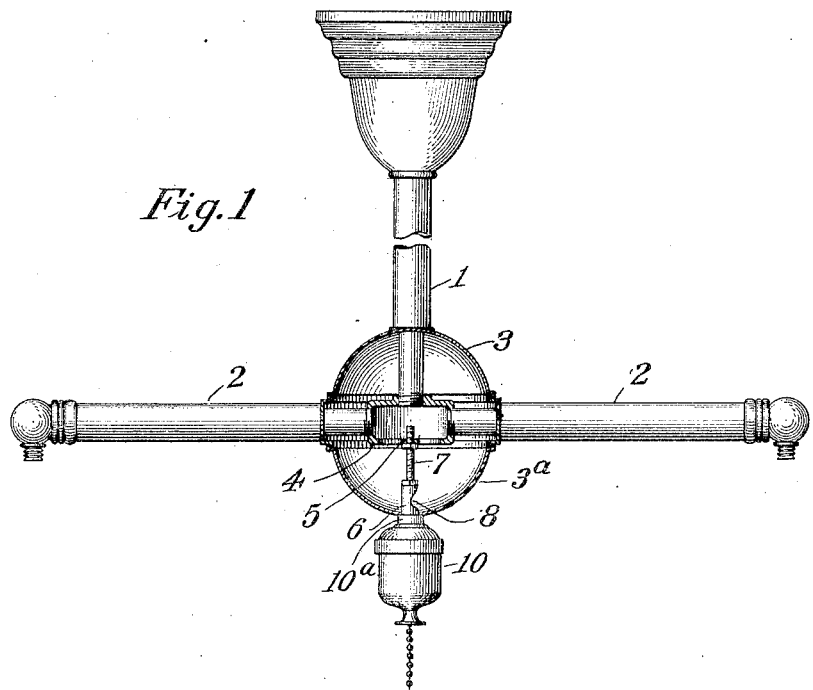
Figure 2:
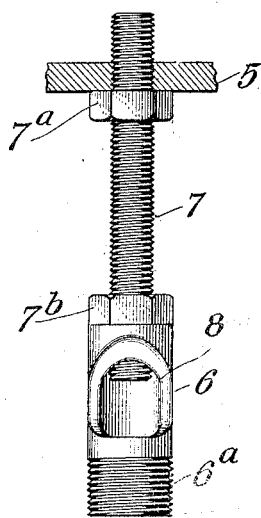
Figure 3:
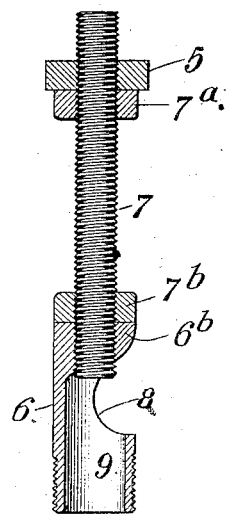

Figure 1 is a view partly in section and partly in elevation, showing a two-arm electrolier provided with my improved fitting. Fig. 2 is a detail of the fitting, this view showing my improved sleeve, and the threaded stud associated therewith. Fig. 3 is a section, taken at right angles to Fig. 2, but showing the same parts.

The tubular electrolier arms appear at 2. A metallic shell member 3 engages the support 1 and the arms 2. This shell member is provided with a detachable portion $3^a$ which serves the purpose of a closure member. The shell member 3 and its closure member $3^a$ together constitute substantially a sphere, as may be understood from Fig. 1. Located within this shell is a distributing box 4 which is connected with the inner extended portions of the arms 2 and the support 1. The distributing box 4 is provided with a bridge 5 extending across its bottom, which except for this bridge is open. Below the distributing box 4 is a sleeve 6, provided externally at its lower end with a thread $6^a$. The sleeve 6 is further provided at its top with a massive portion $6^b$, this portion being threaded internally. A threaded stud 7 fits into the portion $6^b$ of the sleeve. Two nuts $7^a$, $7^b$ are fitted revolubly upon the threaded stud 7. The nut $7^a$ may be rotated so as to jam it against the bridge 5, thus preventing relative movement between the stud 7 and the distributing box 4. The sleeve 6 is turned until it is properly adjusted relatively to the stud 7, and when this is done, the nut $7^b$ is tightened against the upper end of the sleeve 6. The sleeve 6 is provided with a hole 8 extending through its wall, and is also provided with a cylindrical passage 9 into which this hole merges.

A pull switch is shown at 10 and is provided with a neck $10^a$ the upper edge of which is adapted to lodge against the adjacent surface of the closure member 3. This closure member is provided with a hole through which the sleeve 6 extends. The neck $10^a$ is threaded internally to fit upon the lower or threaded portion $6^a$ of the sleeve 6. In order to render the sleeve 6 universal in its application, I make it as short as practicable. By doing this, and by varying the length of the stud 7, the sleeve and parts associated with it may be adapted for electroliers of different sizes.

In practice the wires are threaded downwardly through the tubular supporting member 1 to the distributing box 4, and thence through the arms 2 to the lamps, and also through the hole 8 and passage 9 into the pull switch 10.

The construction above described is especially adapted for use in connection with the standard multiple-arm electrolier. Usually in such electroliers the main wires are joined, within the shell $3^a$, to the pairs of wires leading through the respective arms to the lamps. In such constructions the closure member $3^a$ of the shell 3 is held in place by a standard stud having a 4-27 thread, and upon the lower end of such stud is mounted an ornamental nut, which presses upwardly against the bottom of the closure member, so as to hold it in place.

With the constructions heretofore employed, when it is desired to control all of the lamps from the floor below an electrolier, a flexible cord is passed into the shell, and a pendant switch is located at the bottom of the cord. When, however, this pendant switch is installed low enough to be readily reached by the operator, it is apt to be in the way of tall people walking directly under the electrolier. Again, a flexible cord is expensive, and is troublesome to install. Suppose, now, it be desired to install my improved fitting and parts immediately associated therewith in place of a flexible cord and pendant switch. This is done by merely shortening the stud, enlarging the stud hole in the shell in order to admit the sleeve 6, then screwing the sleeve 6 on to the stud. The pull switch is next screwed directly upon the bottom of the sleeve 6 as above described. In applying my fittings, I require only short wires to connect the switch to the electrolier, and dispense with the flexible cord and the pendant switch. By doing this I save time and trouble, and also attain convenience, simplicity and cheapness.

I claim:

1. As an article of manufacture, a fitting for electroliers comprising a body member having a substantially cylindrical form and provided at one of its ends with a massive portion, and with a hole extending through said massive portion in the general direction of the axis of said body member, said hole being threaded internally, said body member being further provided with an axially disposed channel of greater cross diameter than said hole, said body member being also provided with a laterally disposed opening merging into said channel, and with a thread located externally of said body member and adjacent the end thereof opposite said end bearing said massive portion.

2. In an electrolier, the combination of a central casting provided with a bridge, a stud secured to said bridge, a fitting mounted upon said stud and provided with an axially disposed channel and with a laterally disposed opening merging into said channel to enable wires to be passed through said fitting, a shell member partially inclosing said central casting, means for supporting said central casting rigidly in relation to said shell member, a second shell member detachably engaging said first mentioned shell member, and coacting therewith to completely inclose said central casting, said second mentioned shell member being adapted to be held against said first mentioned shell member by pressure, and a pull switch mounted upon said fitting and provided with a shoulder for engaging said second mentioned shell member, in order to hold the latter against said first mentioned shell member.

3. A fitting for central pull switches for electroliers comprising a body member provided adjacent one of its ends with a tapped hole suitable for a standard stud, said body member being also provided with an opening disposed near the central portion of said body member, and further provided with a channel extending downwardly from said opening, said channel having a larger diameter than said tapped hole, said body member being also provided, adjacent its end opposite said first mentioned end, with a threaded portion to which a standard pull switch may be attached.

4. In an electrolier, the combination of a central casting provided with a bridge, a stud screwed into said bridge, and a fitting attached to said stud, said fitting being provided with a channel larger than said stud for facilitating the passage of wires through said fitting, and a pull switch mounted upon the lower end of the fitting and provided with a shoulder for engaging a shell member of an electrolier.

5. In a device of the character described, the combination of a shell, a distributing box located within said shell and provided with a bridge, hollow arms extending through the wall of said shell and secured to said distributing box, a stud secured to said bridge, a sleeve detachably fitted upon said stud and provided with a hollow cylindrical portion, and a pull switch provided with a portion for engaging said cylindrical portion of said sleeve, said pull switch being further provided with an abutting surface for pressing against said shell.

6. A device of the character described, comprising a shell having a body portion and a closure member for detachably engaging said body portion, a distributing box located within said shell, electrolier arms engaging said shell and extending into said distributing box, a stud detachably secured to said distributing box, a sleeve detachably mounted upon said stud and provided with an opening, said sleeve being further provided with an externally threaded surface, and a pull switch provided with a neck for engaging said threaded portion of said sleeve, and for pressing said closure member against said body portion of said shell.

7. In a device of the character described, the combination of a shell member, a distributing box located within said shell member, electrolier arms engaging both said distributing box and said shell member, a bridge carried by said distributing box and provided with an opening, a stud extending into said opening and secured to said bridge, a sleeve carried by said stud and provided with a passage through which wires may be threaded, and further provided with an opening merging into said passage, a pull switch detachably mounted upon said sleeve, and a closure member supported partly by said sleeve and partly by said pull switch, said closure member engaging said shell member.

8. In a device of the character described, the combination of an open shell member, a distributing box located therein, hollow electrolier arms engaging said box and said shell member, a stud connected with said box, a sleeve carried by said stud and adjustable relatively thereto, a pull switch mounted upon said stud, and a closure member supported by the conjoint action of said sleeve and said pull switch, said closure member detachably engaging said open shell for the purpose of normally maintaining the same closed.

9. In a device of the character described, the combination of an open shell member, a distributing box located therein, electrolier arms engaging said shell member and communicating with said distributing box, a stud carried by said distributing box, a sleeve carried by said stud, a pull switch mounted upon said sleeve and adjustable bodily in relation thereto, and a closure member for engaging said open shell member in order to close the same, said closure member being supported by said sleeve and said pull switch.

CHARLES MESSICK.

Witnesses:
 DONALD M. BLISS,
 MARY KERNAN.

Copies of this patent may be obtained for five cents each, by addressing the "Commissioner of Patents. Washington, D. C."